(12) United States Patent
Herf

(10) Patent No.: US 6,925,210 B2
(45) Date of Patent: Aug. 2, 2005

(54) METHOD FOR BLURRING IMAGES IN REAL-TIME

(76) Inventor: Michael Herf, 10989 Bluffside Dr. #3206, Studio City, CA (US) 91604

(*) Notice: Subject to any disclaimer, the term of this patent is extended or adjusted under 35 U.S.C. 154(b) by 571 days.

(21) Appl. No.: 10/186,628

(22) Filed: Jul. 1, 2002

(65) Prior Publication Data

US 2003/0007701 A1 Jan. 9, 2003

Related U.S. Application Data

(60) Provisional application No. 60/303,499, filed on Jul. 9, 2001.

(51) Int. Cl.[7] .................................................. G06K 9/36
(52) U.S. Cl. ........................ 382/264; 382/276; 382/284
(58) Field of Search ................................ 382/162, 264, 382/265, 276, 284, 299; 345/418, 629, 592–593

(56) References Cited

U.S. PATENT DOCUMENTS

| | | | |
|---|---|---|---|
| 3,814,847 A | | 6/1974 | Longuet |
| 4,517,599 A | * | 5/1985 | Zwirn et al. ................. 348/625 |
| 5,125,041 A | | 6/1992 | Kimura et al. |
| 5,333,213 A | | 7/1994 | Koyama et al. |
| 5,581,667 A | | 12/1996 | Bloomberg |
| 5,748,798 A | | 5/1998 | Nakai et al. |
| 5,751,376 A | | 5/1998 | Hirai |
| 5,757,953 A | | 5/1998 | Jang |
| 5,894,333 A | | 4/1999 | Kanda et al. |
| 5,929,934 A | | 7/1999 | Nakasaka et al. |
| 5,986,659 A | | 11/1999 | Gallery et al. |
| 6,081,615 A | | 6/2000 | Yasui |
| 6,137,919 A | | 10/2000 | Gonsalves et al. |
| 6,154,574 A | * | 11/2000 | Paik et al. ................... 382/255 |
| 6,181,816 B1 | * | 1/2001 | Adams et al. ............... 382/162 |
| 6,198,844 B1 | * | 3/2001 | Nomura ....................... 382/168 |
| 6,259,535 B1 | | 7/2001 | Kurashina et al. |
| 6,269,195 B1 | | 7/2001 | Gonsalves et al. |
| 6,281,933 B1 | | 8/2001 | Ritter |

* cited by examiner

Primary Examiner—Kanjibhai Patel
(74) Attorney, Agent, or Firm—Robert D. Atkins; Quarles & Brady Streich Lang LLP

(57) ABSTRACT

An image processing method takes advantage of the recursive rendering capabilities of graphics hardware devices to blur images in real-time, without a significant amount of computational precision. The image blurring method makes copies of the image to be blurred, transforms the copies using different transformation amounts, and then averages the transformed images together into a blended image. This general process is repeated a predetermined number of times, using the blended image in the subsequent steps, to generate a blurred image.

20 Claims, 7 Drawing Sheets

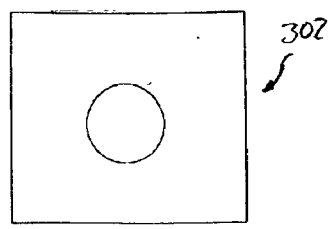
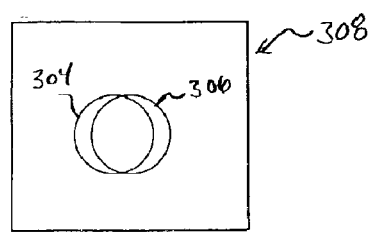
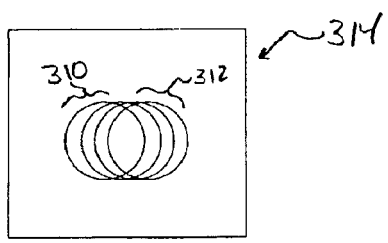
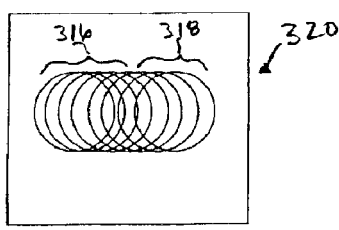
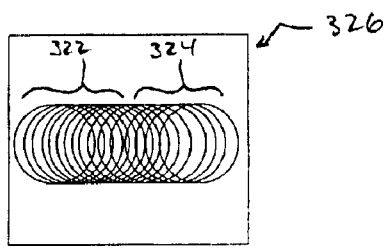
FIG. 3

METHOD FOR BLURRING IMAGES IN REAL-TIME

CROSS-REFERENCE TO RELATED APPLICATION

This application claims the benefit of U.S. Provisional Application No. 60/303,499, filed Jul. 9, 2001.

BACKGROUND OF THE INVENTION

1. Field of the Invention

The present invention relates to image processing and, more particularly, to a method of blurring images in real-time using the recursive rendering capabilities of graphics hardware.

2. Description of Related Art

Many computer-based image processing techniques depend heavily on blurring operations for image manipulation. These blurring operations typically use software-based techniques. However, such techniques are highly computationally intensive and are, therefore, rarely fast enough to be computed in real-time at the high resolutions desired for many applications.

Conversely, many 3-D (three dimensional) graphics hardware devices provide basic imaging operations, including blending and texture mapping operations, that run very quickly. However, the above-noted traditional software blurring techniques may not be directly implemented in graphics hardware, due to memory access patterns and lack of sufficient numerical precision. Thus, 3-D graphics hardware devices implement at most simple fixed-radius blurs, or other types of "brute-force" convolution techniques.

For example, to blur an image using the simplest blur technique, a box filter, a range of pixels is averaged and the result is then written to the center pixel. Performing this operation for every pixel in an image results in a blurred image. In graphics hardware, a conventional implementation of a box filter renders the original image translated multiple times, and then averages all of the translated images together to produce a resulting, blurred image. These repeated operations traditionally use "accumulation buffer" hardware to perform the averaging. Accumulation buffers can be used to implement full-screen anti-aliasing techniques, soft shadows, and motion blur effects. In the context of image blurring, an accumulation buffer generally requires time proportional to the square of the filter radius, using one accumulation operation per value in the blur kernel. As a result, large blurs are too expensive to implement directly using accumulation buffer techniques, as a single frame may contain many thousands of accumulation operations.

Accumulation buffers can be simulated using "recursive render-to-texture," in which the output of each rendering stage is used as a texture map in the next stage. Recursive render to texture has been used to render reflective objects, simulating the multiple bounces that light takes on a path from lights to the viewer of a 3-D scene.

On the other hand, a common implementation of a software image blurring technique is the summed-area table. While computationally efficient, this software-implemented technique also requires a great deal of precision. For example, to blur an 8-bit image, at least 16 bits of precision are needed. Considerably more precision is needed for large radii blurs. This technique is very computationally efficient, generally requiring a constant amount of time regardless of radius. Unfortunately, these high-precision image formats are not available in presently designed graphics hardware.

Hence, there is a need in the art for an efficient image processing technique that makes image blurring a real-time effect, without requiring significantly more precision than is used by the output image. Applications include blurring of video, imagery, and type; motion graphics effects; and 3-D scene display for interactive and production purposes.

SUMMARY OF THE INVENTION

The present invention provides an image blurring technique that takes advantage of the ability of graphics hardware to do recursive rendering. The invention involves exploiting the recursive capability of graphics hardware in a novel way to blur images in real-time and, in particular, time proportional to the log of the radius of the blur kernel.

In one embodiment of the present invention, and by way of example only, a method of blurring an original image in a graphics hardware environment includes generating at least two copies of at least a portion of the original image, transforming at least a first one of the copies a predetermined number of pixels in a first direction, transforming at least a second one of the copies the predetermined number of pixels in a second direction that is opposite the first direction, averaging the transformed copies together to generate a blended image, changing the predetermined number of pixels by a predetermined factor, and repeating the previous steps a predetermined number of times using the blended image instead of the original image to thereby generate a blurred image.

Other independent features and advantages of the preferred image blurring method will become apparent from the following detailed description, taken in conjunction with the accompanying drawings which illustrate, by way of example, the principles of the invention.

BRIEF DESCRIPTION OF THE DRAWINGS

FIG. 3 is a simplified diagram depicting a generalized motion blur using the method depicted in FIG. 1;

DETAILED DESCRIPTION OF THE PREFERRED EMBODIMENTS

Figure 1:
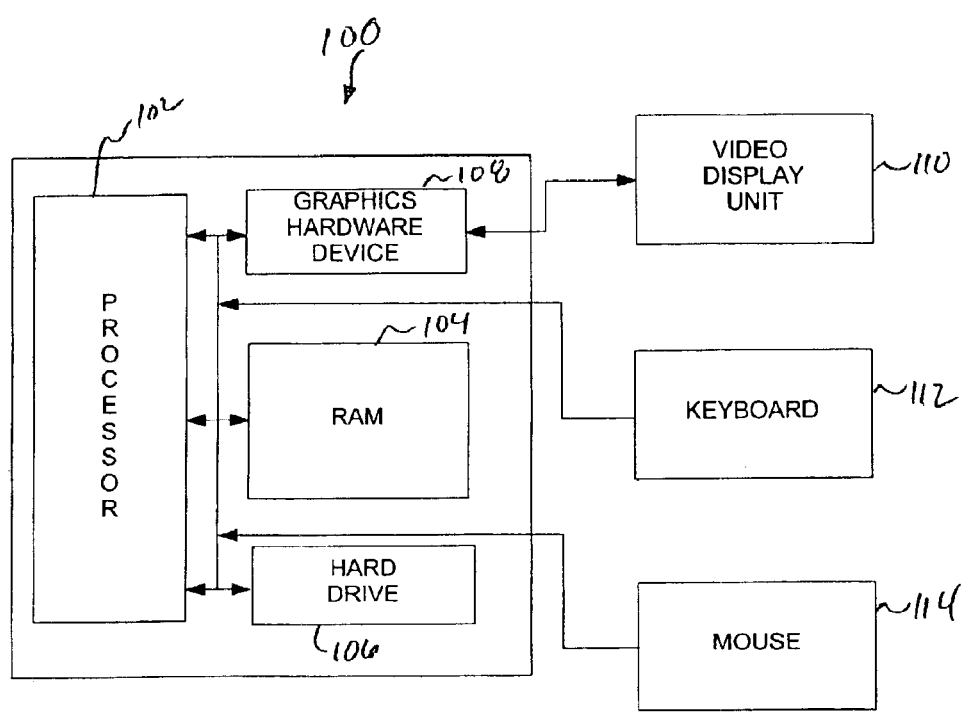
FIG. 1 is a generalized block diagram of a computer system which may be used to implement the method of the present invention.

The image blurring methods of the present invention may be implemented using a computer system, such as the one depicted schematically in FIG. 1. The computer system 100 includes, among other things, a processor 102, random access memory (RAM) 104, a hard drive 106, and a graphics hardware device 108. The computer system 100 may also include input/output (I/O) devices, such as a video display unit 110, a keyboard 112, and a mouse 114. The RAM 104 is programmed to cause the processor 102 and graphics hardware device 108 to perform the image blurring methods of the present invention and to display the results of the method on the video display unit 110. The processor 102 may be any one of numerous known processor devices known in the art including, but not limited to, the Pentium family of processors available from Intel Corporation, and the Athlon family of processors available from Advanced Micro Devices, Incorporated. The graphics hardware device 108 may be any one of numerous devices known in the art including, but not limited to, the GeForce family of video hardware available from NVIDIA Corporation, the Radeon family of video hardware available from ATI Corporation, and a variety of graphics hardware available from Matrox, 3Dlabs, and SGI.

Figure 2:
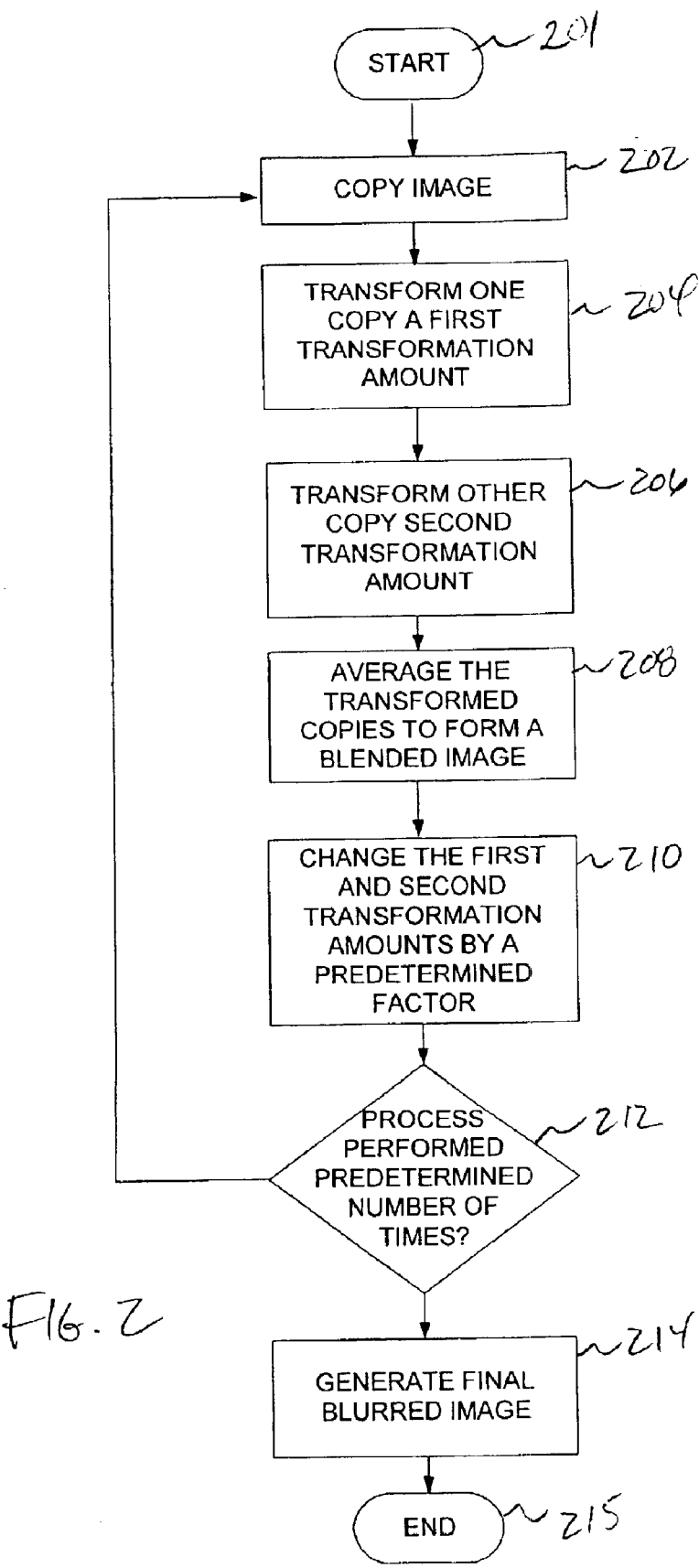
FIG. 2 is a flowchart depicting the generalized image blurring method according to a preferred embodiment of the present invention.

A generalized image blurring method according to a preferred embodiment of the present invention, and that may be carried out using the computer system 100 depicted in FIG. 1, is illustrated in FIG. 2. First, two or more copies of the image that is to be blurred are generated (STEP 202) and temporarily stored. These two copies may be generated using any one of numerous rendering techniques known in the art, including multi-texture rendering and multi-pass rendering techniques. In particular, the technique used ideally will be able to precisely account for the sum of the two images' values, such that averaging two 8-bit images uses 9 bits of precision, avoiding round-off error.

Once the copies of the image are generated and temporarily stored, one of the generated copies is transformed a first transformation amount (STEP 204), and the other generated copy is transformed a second transformation amount (STEP 206). The transformed copies are then averaged together to form a blended image (STEP 208), which is then temporarily stored. It is noted that the general term "transformed" as used herein can have different meanings, depending upon the particular type of blur being implemented by the method 200. This will become clearer as various types of blurs implemented by the method 200 are discussed further below.

After the transformed copies are averaged together, the first and second transformation amounts are each changed by a predetermined factor (STEP 210). It will be appreciated that this factor may be any one of numerous desired magnitudes. It will additionally be appreciated that the change implemented by the factor may be to either increase or decrease the transformation amounts. For example, in the case where the transformation is image translation, if the predetermined factor has a magnitude of two, the method may be implemented such that the transformation amounts are either doubled or halved. In either case, once the transformation amounts are updated, it is then determined whether the previous steps (STEPs 202–210) have been performed a predetermined number of times (STEP 212). If not, then the previous steps (STEPs 202–210) are repeated using the blended image instead of the original image. Conversely, if the previous steps have been performed the predetermined number of times, then the final blurred image is generated and is stored and/or displayed (STEP 214). It should be appreciated that the predetermined number of times that STEPs 202–210 are repeated may be any predetermined number needed to obtain a desired blurring effect. However, in the preferred embodiment, the number of repetitions is minimized in order to render the final blurred image relatively quickly. It should additionally be appreciated that, in the context of the present invention, the "predetermined number of times" may correspond to either a specified number of steps or to whether the transformation amounts exceed a predetermined threshold.

The generalized image blurring method 200 may be used to carry out various types of image blurs known in the art. For example, the method may be used to carry out a motion blur, a Box blur, a Gaussian blur, a Spin blur, and a Zoom blur, each of which will now be described separately.

Figure 4:
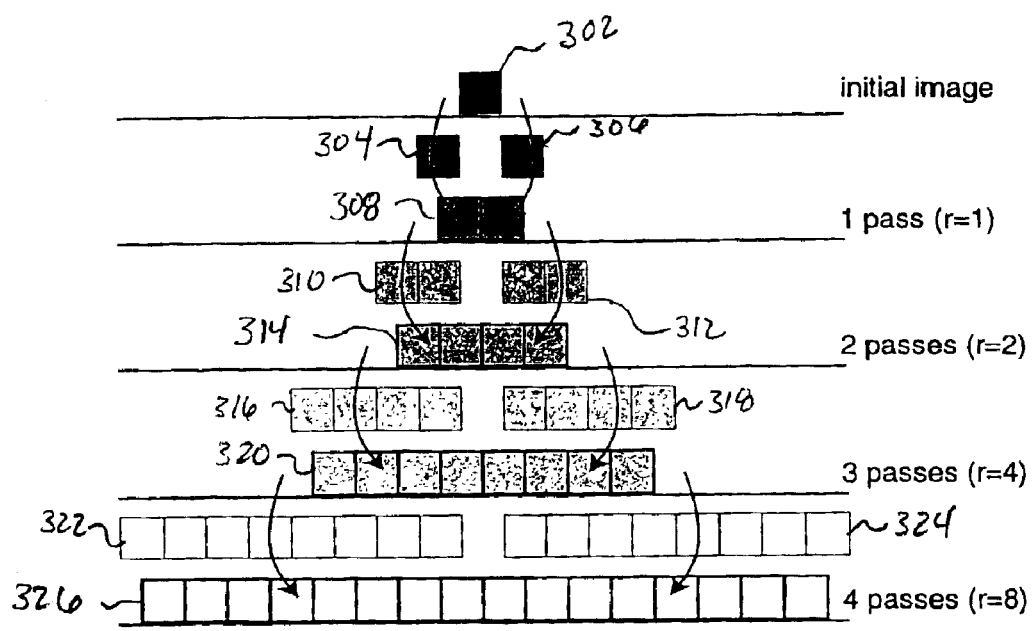
FIG. 4 is a simplified diagram depicting an 8-pixel radius box filter used to carry out the motion blur depicted in FIG. 2.

Turning first to FIG. 3, in combination with FIG. 4, a simple motion blur using the method of the present invention will first be described. For this type of blur, the transformation is a linear displacement of the copied images. It should be appreciated that for the blur depicted in FIGS. 3 and 4, the method 200 emulates an 8-pixel radius box filter using two-stage multi-texture and recursive rendering. As such, the first and second transformation amounts are each translations of a predetermined number of pixels (N), but in directions that are different from one another. In addition, the predetermined factor by which the transformation amounts (e.g., number of pixels) is changed has a magnitude of two, and the predetermined number of times the process is repeated is four.

Initially, the original image 302 to be blurred is rendered into a texture, a video image, or still image, using any one of numerous known image rendering techniques. The image 302 may be simultaneously stored in memory 104 and displayed on the video display unit 110, or simply stored in memory 104, during the blurring process 200. Then, two copies of the rendered original image 302, or a portion of the rendered original image 302, including at least a first copy 304 and a second copy 306, are generated (STEP 202) and translated a predetermined number (N) of pixels in different directions (STEPs 204 & 206). The translated images 304 and 306 are then combined together using, for example, an alpha blending operator to form a new blended image 308 (STEP 208). Thus, the blended image 308 is the result of the two copied images 304 and 306 being averaged (or convolved) together and offset from one another by the predetermined number of pixels (N). This gives the effect of an N-pixel box filter. In other words, if the copies 304 and 306 are each translated −0.5 and +0.5 pixel, hrespectively, and then averaged together, the resulting blended image 308 is rendered similar to what it would have been had the original image 302 been operated on by a 0.5 pixel box filter.

Next, the blended image 308 that has just been computed is now operated on just as the original image 302 was in the previous steps, with the exception that the predetermined number of pixels (N) is now doubled (STEP 210). In other words, the emulated box filter radius is doubled, from 0.5 pixel to 1.0 pixel. Thus, a first copy 310 and a second copy 312 of the blended image 308 (or portion of the blended image 208) are generated and translated −1.0 and +1.0 pixel, and are combined together to form a new blended image 314. Thereafter, the process is repeated using translations of −2.0 pixels and +2.0 pixels, and then −4.0 pixels and +4.0 pixels, and so on, for a predetermined number of repetitions (STEP 212), to generate a final blurred image 326 (STEP 214).

The final blurred image 326 is an image that has been effectively blurred in $\log_2(\text{radius}+1)$ operations. In the case depicted in FIG. 3, the effective box filter radius is 7.5; that is, the radius is the sum of all of the effective radii of each repetition (e.g., 0.5+1.0+2.0+4.0=7.5). Hence, the final blurred image 316 is generated in only four operations. It is noted that for most radii, the filter in the graphics hardware device 108 will effectively blur the image by 0.5-pixel, making the 0.5-radius pass unnecessary. As such, the blurring operation may be completed in $\log_2(\text{radius})$ operations. Hence, the time it takes the blurring method 200 to perform the blur is proportional to the logarithm of the blur radius, rather than a time that is proportional to the blur radius, as with conventional accumulation-buffer-based blurring methods.

It is noted that the repetitions implemented as part of the blurring method 200 may be performed in any radius order. In other words, because of the generally known commutative property of convolution, the order in which each of the predetermined number of pixels (N) (e.g., the effective radii) is applied in the blurring method 200 may be arbitrary. For example, the method 200 can effectively blur the original image 302 at +/−1.0 pixel, +/−4.0 pixels, +/−2.0 pixels, and +/−0.5 pixel, respectively, rather than in the order described above. Indeed, in the preferred embodiment, the original image 302 is blurred using largest desired radius first (e.g., +/−4.0 pixels in example depicted in FIG. 3). The radius is then halved until a predetermined threshold, generally a single pixel radius, is reached.

It is additionally noted that the translations described above are not limited to the major axes. Indeed, the first and second copies in each repetition may also be translated along an arbitrary vector, in which case the radius is measured in Euclidean distance. This blurring technique is commonly referred to as a "directional blur" or "motion blur."

The motion blurs described above can be extended to generate a two-dimensional blur, which approximates the so-called "Gaussian blur." To do so, the blurring method 200 is first performed along a first axis. Then, the blurring method 200 is performed a second time, using the result of the first run, along a second axis that is perpendicular to first axis, exploiting the separability of the filter to do the work efficiently. This Gaussian blur approximation method 500 is depicted in flowchart form in FIG. 5. Because the Gaussian blur method 500 is a straightforward extension of the previously described general method 200, which the skilled artisan will readily understand and appreciate, it will not be further described in detail.

Figure 6:
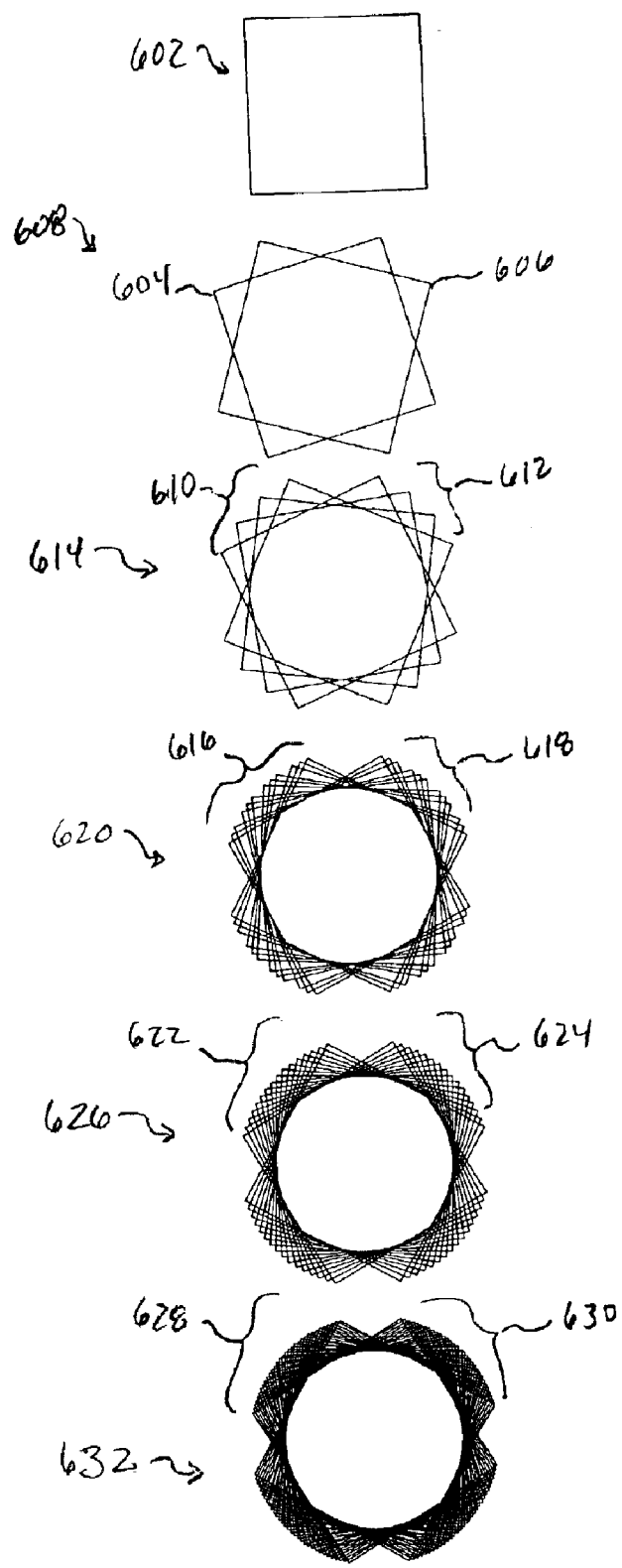
FIG. 6 is a simplified diagram depicting a generalized spin blur using the method depicted in FIG. 1.

As previously noted, the general blurring method 200 can be extended to other types of image blurring techniques. For example, a "spin blur" can be approximated by using an angular rotation for the image transformation instead of the linear displacement illustrated in FIG. 3. This particular blurring operation is illustrated more clearly in FIG. 6, and will now be described.

As before, the original image to be blurred 602 is rendered into a texture, and at least two copies (or a portion thereof) of the original image 602, including at least a first copy 604 and a second copy 606, are generated (STEP 202). Then, instead of translating the copies, the first 604 and second 606 copies are transformed by rotating each a predetermined number (N) of pixels in different directions (STEPs 204 & 206). It is noted that the predetermined number of pixels (N) of rotation corresponds to a desired rotation angle.

The rotated images 604 and 606 are then combined together, as before, to form a new blended image 608 (STEP 208), which is operated on just as the original image 602 was in the previous steps, with the exception that the rotation angle is now changed by a predetermined factor (STEP 210). Thus, a first copy 610 and a second copy 612 of the blended image 608 (or portion thereof) are generated and rotated, and are combined together to form a new blended image 614. Thereafter, the process is repeated using differing rotation angles, for a predetermined number of repetitions (STEP 212), to generate a final blurred image 632 (STEP 214). In the depicted embodiment, the initial rotation angle is halved during each repetition, and the process is repeated until the rotation at the edge of the image is less than a pixel. Thus, in the depicted embodiment, five repetitions were performed. It will be appreciated that this is only exemplary of a single depicted embodiment, and that the initial rotation angle and number of repetitions may vary to achieve a desired blurring effect.

As was previously noted, the generalized blurring method 200 can also be extended to perform so-called "zoom blurring" operations. However, for this type of blur, rather than using a linear sequence and repeatedly transforming the copied images (linearly or rotationally) a predetermined amount relative to a previous repetition, a log-space sequence is used and the copied images are transformed by repeatedly scaling the copies relative to previous repetitions. More particularly, instead of displacing the copied images, either translationally or rotationally, the copies are rendered at two different scales, preferably using $^{k12}\sqrt{N}$ and $(^{k12}\sqrt{N})^{-1}$ scale pairs. In other words, the blurring method 200 begins with a desired maximum scale value (N). Then, during each subsequent repetition (e.g., STEPS 202–210), the square root of this scale is taken and then the scale and its inverse are used to transform the copied images and render the blended image in each repetition. It should be appreciated that the scaling value (N) may be chosen as desired to achieve the desired blurring effect.

Figure 7:
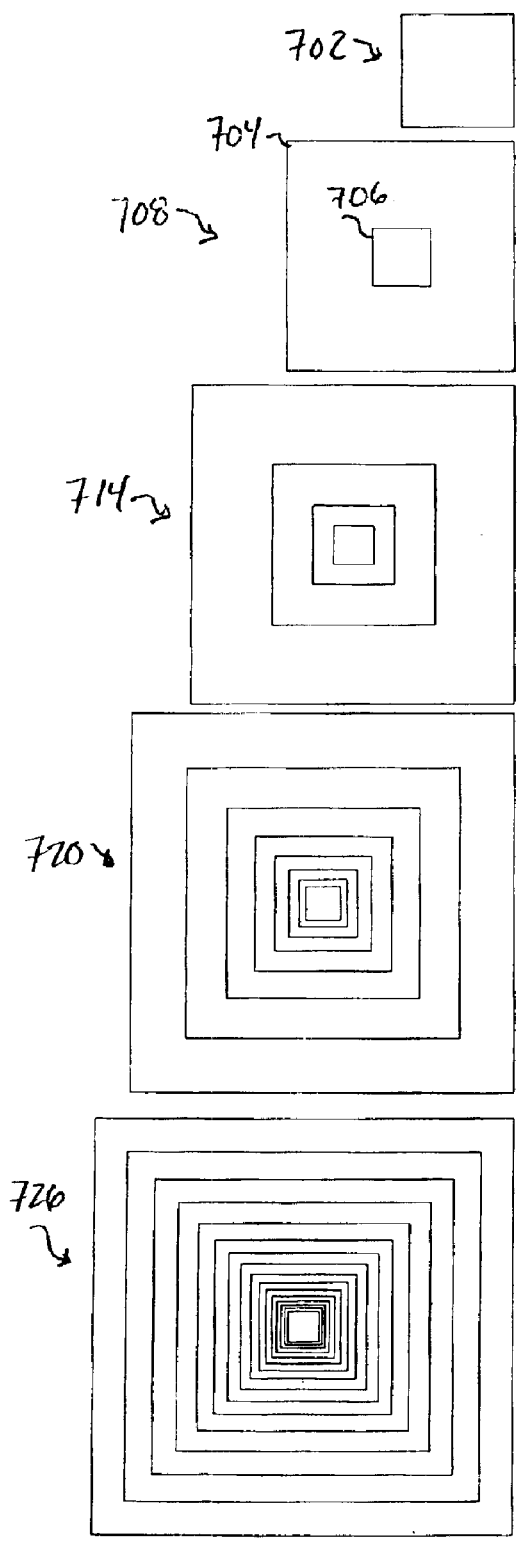
FIG. 7 is a simplified diagram depicting a generalized zoom blur using the method depicted in FIG. 1.

The zoom blur implementation of the method 200 is depicted more clearly in simplified diagrammatic form in FIG. 7, and will now be described in more detail. As FIG. 7 illustrates, the zoom blur is similar to the motion and spin blurs, in that initially at least two copies 704 and 706 of the image 702 that is to be blurred are generated (STEP 202). Once the copies of the image are generated, one of the generated copies 704 is scaled up by a predetermined scaling factor (STEP 204), and the other generated copy 706 is scaled down by the inverse of the predetermined scaling factor (STEP 206). The scaled copies are then averaged together to form a blended image 708 (STEP 208).

After the scaled copies are averaged together, the predetermined scaling factor that the generated copies are each scaled by is changed by a predetermined factor (STEP 210). It will be appreciated that this factor may be any one of numerous desired numbers; however, as noted above, the scaling factor is preferably changed by taking its square root. Once the scaling factor is updated, the process then determines whether the previous steps (STEPs 202–210) have been performed a predetermined number of times (STEP 212). If not, then the previous steps (STEPs 202–210) are repeated using the blended image 708 instead of the original image 802. Conversely, if the previous steps have been performed the predetermined number of times, then a final blurred image 726 is generated and is stored and/or displayed (STEP 214). It should be appreciated that the predetermined number of times that STEPs 202–210 are repeated may be any predetermined number needed to obtain a desired blurring effect. However, in the preferred embodiment, the number of repetitions is minimized in order to render the final blurred image relatively quickly. And, more particularly, STEPS 202–210 are preferably repeated until subpixel detail is achieved.

Figure 5:
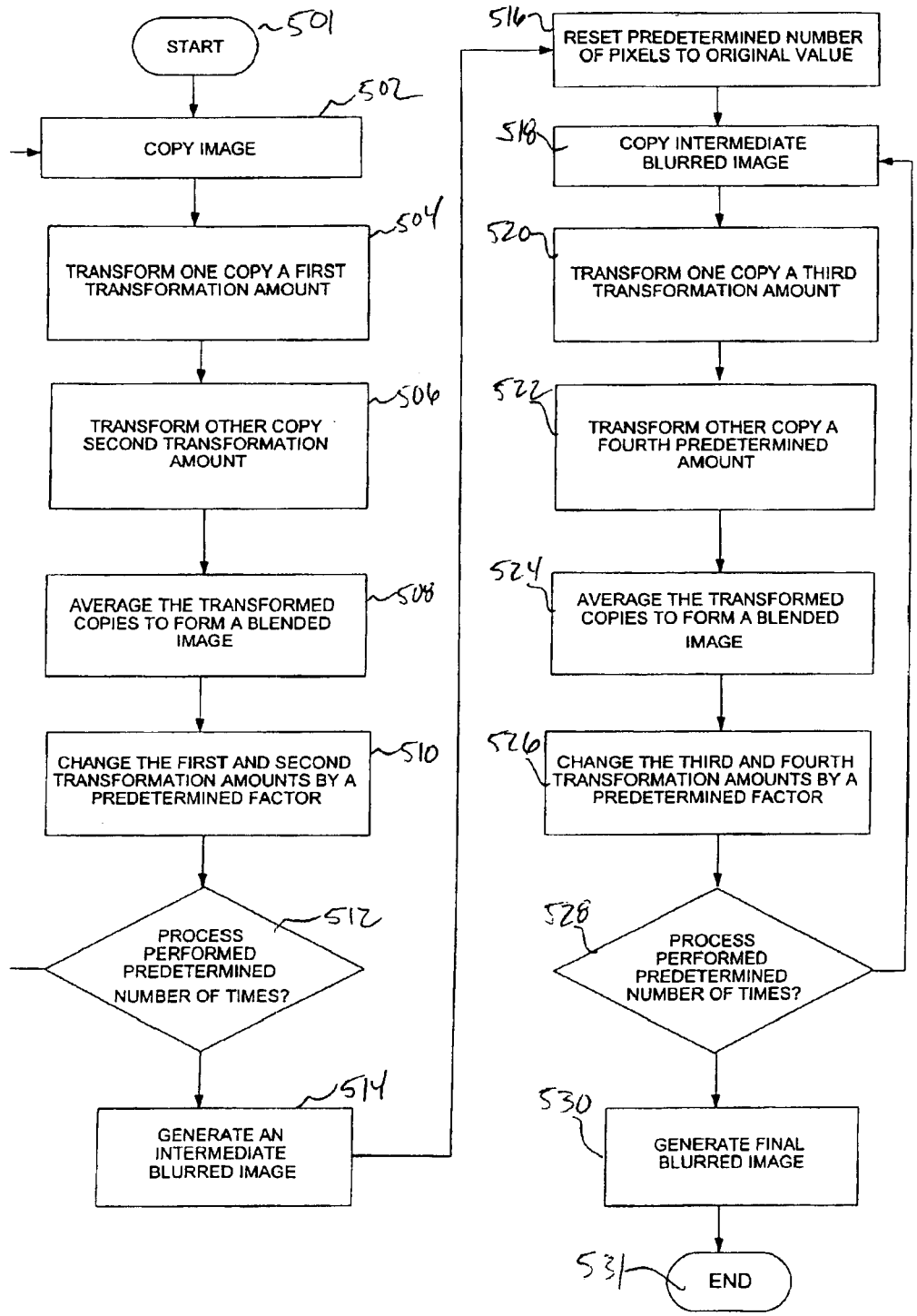
FIG. 5 is a flowchart depicting the generalized image blurring method of FIG. 2, extended to perform a two-dimensional image blur.

The above-described image blurring operations were, for consistency and ease of explanation, described as being implemented to emulate the simple, low order box filter. However, it should be appreciated that the image blurring method 200 can also be implemented to emulate higher order filters, such as second-order and third-order uniform b-spline filters, and it can also use the capabilities of graphics hardware to render these effects in fewer passes than are needed by using just two inputs. Two techniques can be used by the blurring method 200 to implement these higher order filters. First, the general blurring method 200 can be applied repeatedly. In other words, to implement a second-order b-spline (e.g., a triangle filter), the general blurring method 200 can be repeated twice, as is illustrated in FIG. 5, and alluded to previously. Similarly, to implement a third-order b-spline (i.e., a quadratic filter), the general blurring method can repeated three times, and so on.

With the second technique, additional images (e.g., more than two) are averaged together using a weighted averaging technique, thereby emulating a multi-input box filter with the inputs weighted. For example, for a second-order b-spline filter, three inputs can be weighted at 0.25, 0.5, and 0.25 (e.g., 1-2-1 filtering) to achieve the effect of convolving two box filters. Similarly, for a third-order b-spline filter, four inputs can be weighted at 0.125, 0.375, 0.375, and 0.125 (e.g., 1-3-3-1 filtering) to achieve the effect of convolving three box filters.

The image blurring method described above takes advantage of the ability of graphics hardware to do recursive rendering, and exploits this recursive rendering capability in a novel way to blur images in real-time, without a great deal of computational precision.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. In a graphics hardware environment, a method of blurring an original image, comprising:
   a) generating at least two copies of at least a portion of the original image;
   b) transforming at least a first one of the copies a first transformation amount;
   c) transforming at least a second one of the copies a second transformation amount that is different from the first transformation amount;
   d) averaging the transformed copies together to generate a blended image;
   e) changing the first and second transformation amounts by a predetermined factor; and
   f) repeating steps a) through e) a predetermined number of times using the blended image instead of the original image to thereby generate a blurred image.

2. The method of claim 1, wherein:
   the transforming of the copies is a linear displacement; and
   the first and second transformation amounts are each a predetermined number of pixels in directions that differ from one another.

3. The method of claim 2, further comprising:
   repeating steps a) through f) using a third transformation amount and a fourth transformation amount instead of the first and second transformation amounts, respectively,
   wherein the third transformation amount is in a direction perpendicular to the first transformation amount and the fourth transformation amount is in a direction perpendicular to the second transformation amount.

4. The method of claim 1, wherein:
   the transforming of the copies is an angular displacement; and
   the first and second transformation amounts correspond to rotational directions that differ from one another.

5. The method of claim 4, wherein the rotational directions correspond to predetermined rotational angles.

6. The method of claim 1, wherein the transformed copies are averaged using a weighted average.

7. The method of claim 1, wherein the predetermined factor is a number less than one.

8. The method of claim 1, wherein the transforming of the copies is a relative scaling thereof.

9. The method of claim 8, wherein the second transformation amount is a multiplicative inverse of the first transformation amount, whereby the first one of the copies is a scaled up relative to the copied image and the second one of the copies is scaled down relative to the copied image.

10. The method of claim 1, wherein:
    the time it takes to repeat steps a) through f) the predetermined number of times is equal to O(log r), where "r" is a blur radius.

11. A computer-readable medium containing computer executable code for instructing one or more graphics hardware devices in a computer system to blur an original image, the instructions comprising:
    a) generating at least two copies of at least a portion of the original image;
    b) transforming at least a first one of the copies a first transformation amount;
    c) transforming at least a second one of the copies a second transformation amount that is different from the first transformation amount;
    d) averaging the transformed copies together to generate a blended image;
    e) changing the first and second transformation amounts by a predetermined factor; and
    f) repeating steps a) through e) a predetermined number of times using the blended image instead of the original image to thereby generate a blurred image.

12. The computer-readable medium of claim 11, wherein:
    the transforming of the copies is a linear displacement; and
    the first and second transformation amounts are each a predetermined number of pixels in directions that differ from one another.

13. The computer-readable medium of claim 12, further comprising:
    repeating steps a) through f) using a third transformation amount and a fourth transformation amount instead of the first and second transformation amounts, respectively,
    wherein the third transformation amount is in a direction perpendicular to the first transformation amount and the fourth transformation amount is in a direction perpendicular to the second transformation amount.

14. The computer-readable medium of claim 11, wherein:
    the transforming of the copies is an angular displacement; and
    the first and second transformation amounts correspond to rotational directions that differ from one another.

15. The computer-readable medium of claim 14, wherein the rotational directions correspond to predetermined rotational angles.

16. The computer-readable medium of claim 11, wherein the transformed copies are averaged using a weighted average.

17. The computer-readable medium of claim 11, wherein the predetermined factor is a number less than one.

18. The computer-readable medium of claim 11, wherein the transforming of the copies is a relative scaling thereof.

19. The computer-readable medium of claim 18, wherein the second transformation amount is a multiplicative inverse of the first transformation amount, whereby the first one of the copies is a scaled up relative to the copied image and the second one of the copies is scaled down relative to the copied image.

20. The computer-readable medium of claim 11, wherein:

the time it takes to repeat steps a) through f) the predetermined number of times is equal to O(log r), where "r" is the blur radius.

* * * * *